United States Patent
Fontecchio et al.

(10) Patent No.: US 9,745,876 B2
(45) Date of Patent: Aug. 29, 2017

(54) OIL FILTER SYSTEMS

(71) Applicant: General Electric Company, Schenectady, NY (US)

(72) Inventors: Paul John Fontecchio, Erie, PA (US); Gregory Alan Marsh, Erie, PA (US); Mark Thomas Zysk, Erie, PA (US); Paul James Wadding, Union City, PA (US); Michael Edward Keverline, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/957,581

(22) Filed: Dec. 2, 2015

(65) Prior Publication Data

US 2016/0160715 A1 Jun. 9, 2016

Related U.S. Application Data

(63) Continuation-in-part of application No. 13/852,250, filed on Mar. 28, 2013, now Pat. No. 9,550,137.

(60) Provisional application No. 62/088,758, filed on Dec. 8, 2014.

(51) Int. Cl.
| | |
|---|---|
| *F01M 1/10* | (2006.01) |
| *F01M 11/03* | (2006.01) |
| *B01D 35/30* | (2006.01) |
| *F02M 37/00* | (2006.01) |
| *B60K 15/01* | (2006.01) |
| *F01M 5/00* | (2006.01) |
| *B01D 35/18* | (2006.01) |
| *B01D 29/52* | (2006.01) |

(52) U.S. Cl.
CPC ............ *F01M 11/03* (2013.01); *B01D 29/52* (2013.01); *B01D 35/18* (2013.01); *B01D 35/30* (2013.01); *B60K 15/01* (2013.01); *F01M 1/10* (2013.01); *F01M 5/00* (2013.01); *F02M 37/007* (2013.01); *F01M 2011/033* (2013.01)

(58) Field of Classification Search
CPC . F01M 11/03; F01M 5/00; F01M 1/10; B60K 15/01; B01D 35/005; B01D 35/30
See application file for complete search history.

(56) References Cited

U.S. PATENT DOCUMENTS

| | | | |
|---|---|---|---|
| 3,912,633 A | 10/1975 | Delaney | |
| 6,334,950 B1 | 1/2002 | Bogacki | |
| 7,413,089 B1 * | 8/2008 | Tidwell | B01D 27/06 210/130 |
| D648,822 S | 11/2011 | Salvador | |
| D656,577 S | 3/2012 | Salvador | |
| 8,349,180 B2 | 1/2013 | Milum | |
| 8,418,448 B2 * | 4/2013 | Kamata | B60K 5/1208 60/299 |
| 9,133,601 B2 * | 9/2015 | Mori | E02F 9/0866 |
| 9,238,988 B2 * | 1/2016 | Spooner | F02F 7/0082 |

(Continued)

*Primary Examiner* — John Walters
*Assistant Examiner* — James Triggs
(74) *Attorney, Agent, or Firm* — GE Global Patent Operation

(57) ABSTRACT

Various methods and systems are provided for an oil filter system for a vehicle system. In one example, an oil filter system comprises a housing within which a plurality of oil filter elements are disposed and a frame supporting the housing, the frame including one or more mountings configured to support one or more vehicle sub-assemblies.

20 Claims, 18 Drawing Sheets

(56) References Cited

U.S. PATENT DOCUMENTS

2007/0045173 A1  3/2007  Zimmerman
2008/0179235 A1  7/2008  Hacker
2013/0313178 A1  11/2013  O'Hern et al.

* cited by examiner

OIL FILTER SYSTEMS

CROSS REFERENCE TO RELATED APPLICATIONS

This application claims priority to U.S. Patent Application No. 62/088,758, filed Dec. 8, 2014, which is hereby incorporated in its entirety herein by reference for all purposes.

FIELD

Embodiments of the subject matter disclosed herein relate to an oil filter housing for a vehicle system.

BACKGROUND

Oil filters are used in engine systems to remove contaminants from engine oil before the oil enters the engine. Oil filter elements are mounted within the oil filter and are made up of porous media. As oil passes through the oil filter elements in the oil filter, contaminants become entrained in the filter while clean oil passes through the pores and exits the filter to enter the engine. Such oil filters may be contained within a vehicle system, and thus may include a support frame for mounting the oil filter to the vehicle system. The vehicle system may also include various sub-assemblies, such as fuel sub-assemblies, that are also mounted via a support frame. The inclusion of multiple vehicle sub-assemblies each supported by separate support frames may increase the cost and weight of the vehicle.

BRIEF DESCRIPTION

In one embodiment, an oil filter system comprises a housing and a frame. The housing includes a hollow cylinder having a convex curvature and which is configured to receive a plurality of oil filter elements disposed therein. The frame supports the housing and includes a first set of support arms and a second set of support arms, each support arm having a first, straight side facing away from the housing and a second, curved side having a concave curvature in one or more regions that contact the convex curvature of the housing. The straight side of each support arm of the first set of support arms are located in the same first plane, and the straight side of each support arm of the second set of support arms are located in the same second plane, each straight side of each support arm further including one or more mountings configured to support one or more vehicle sub-assemblies.

BRIEF DESCRIPTION OF THE DRAWINGS

The invention will be better understood from reading the following description of non-limiting embodiments, with reference to the attached drawings, wherein below.

DETAILED DESCRIPTION

Embodiments of the subject matter disclosed herein relate to an oil filter system for an engine system. The oil filter system may include a housing which is configured to receive a plurality of filter elements therein, e.g., the plurality of filter elements are disposed in the housing for operation of the engine system, but may be removed for servicing, replacement, or before the engine system is first put into service. The filter elements may trap particles within engine oil, removing the particles before the engine oil is sent to the engine. The housing may be supported by a frame. The frame may be configured to couple the oil filter to a desired vehicle structure as well as prevent the oil filter from experiencing a high level of movement or vibrations. Further, the frame may also be configured to support one or more vehicle sub-assemblies, such as fuel sub-assembly (including, for example, fuel filters, fuel pump, fuel-water separator, etc.) and an oil cooler sub-assembly. In this way, a common frame may be used to support not only the oil filter, but also the fuel sub-assembly and the oil cooler sub-assembly, eliminating the need for multiple, separate support frames and reducing the weight of the entire oil filter, frame, fuel, and oil cooler assembly.

An example of a vehicle system in which the oil filter and frame described above may be installed is illustrated in FIG. 1. FIGS. 2-11 illustrate the oil filter and frame. FIGS. 12-18 illustrate the oil filter, frame, and associated vehicle sub-assemblies. FIGS. 4-11 are drawn to scale, although other relative dimensions may be used, if desired or as suggested herein.

The approach described herein may be employed in a variety of engine types, and a variety of engine-driven systems selected with reference to application specific criteria. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive may be used as an example of a mobile platform supporting a system incorporating an embodiment of the invention.

Figure 1:
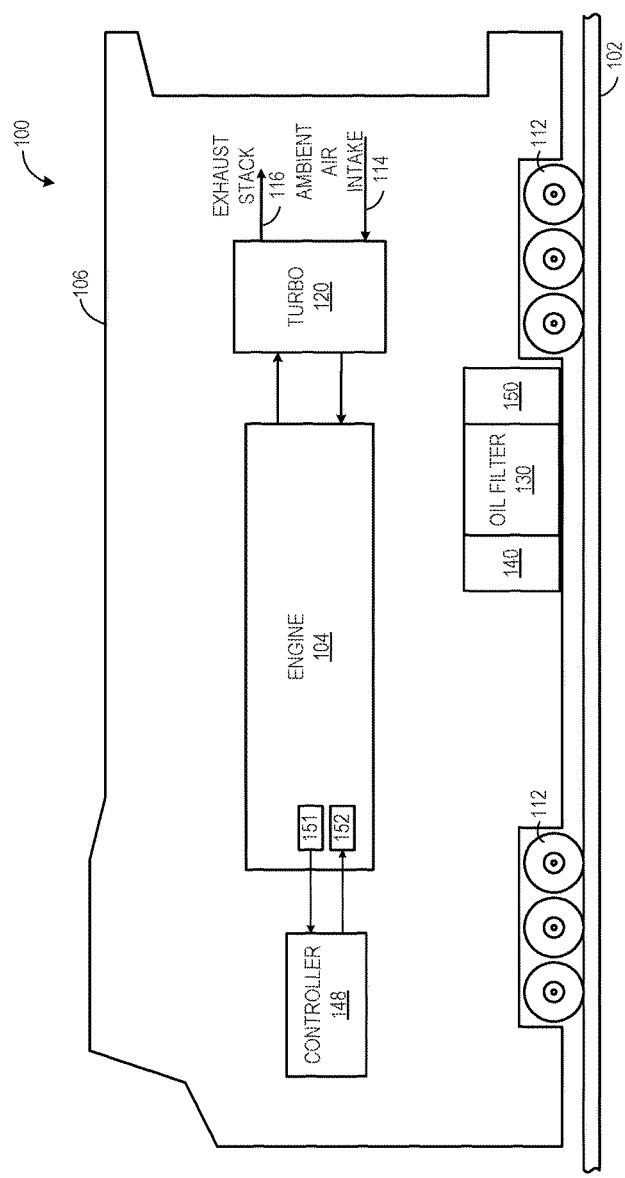
FIG. 1 shows a schematic diagram of a vehicle with an oil filter according to an embodiment of the disclosure.

Before further discussion of the oil filter housing embodiments, a positioning of an oil filter in an engine system is shown. FIG. 1 shows a block diagram of an embodiment of a vehicle system 100 (e.g., a locomotive system), herein depicted as vehicle 106. The illustrated vehicle is a rail vehicle configured to run on a rail 102 via a plurality of wheels 112. As depicted, the vehicle includes an engine system with an engine 104 supported by an engine block (not shown).

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system may include a turbocharger 120 ("TURBO") that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages, e.g., the engine system may include high and low pressure turbochargers disposed in series with respect to the engine exhaust and air intake.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, as well as filters or other systems and devices.

Engine oil may be used to lubricate various engine components within the engine, such as pistons, bearings which allow rotation of a crankshaft and camshaft, or the like. Before oil is routed to the various engine components, the engine oil may first pass through an oil filter to remove contaminants such as dirt, carbon, and metallic particles. In this way, engine degradation from abrasive wear between particles and engine components may be reduced.

Engine oil may flow from the engine to an oil inlet of an oil filter 130. The engine oil then flows through the inside of the oil filter where contaminants may be filtered from the engine oil. After passing through the oil filter, filtered engine oil exits at an oil outlet of the oil filter and flows back into the engine where the oil may be used again by the engine components.

The oil filter may comprise an oil filter housing and one or more oil filter elements within the oil filter housing (not shown in FIG. 1). The oil filter may include an engine support skid frame integrated with the housing of the oil filter. The frame may be used to couple the oil filter to a desired vehicle system structure. Further, the frame may support and provide coupling to a fuel sub-assembly 140 and oil cooler sub-assembly 150. Further description of the oil filter housing and frame is presented below with regard to FIGS. 2-18. The oil filter, frame, and associated sub-assemblies (referred to collectively as the oil filter assembly) may be coupled in the vehicle in a space separate from the engine. In one embodiment, the oil filter assembly may be located on the floor of the vehicle, for example via coupling to the vehicle frame. In embodiments, the frame of the oil filter system may be separate from the engine block and separate from the vehicle frame.

A controller 148 may be employed to control various components related to the vehicle system. In one embodiment, the controller includes a computer control system. The controller further includes computer readable storage media (not shown) including code for enabling on-board monitoring and control of vehicle operation. The controller, while overseeing control and management of the vehicle system, may receive signals from a variety of sensors 151, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

Figure 2:
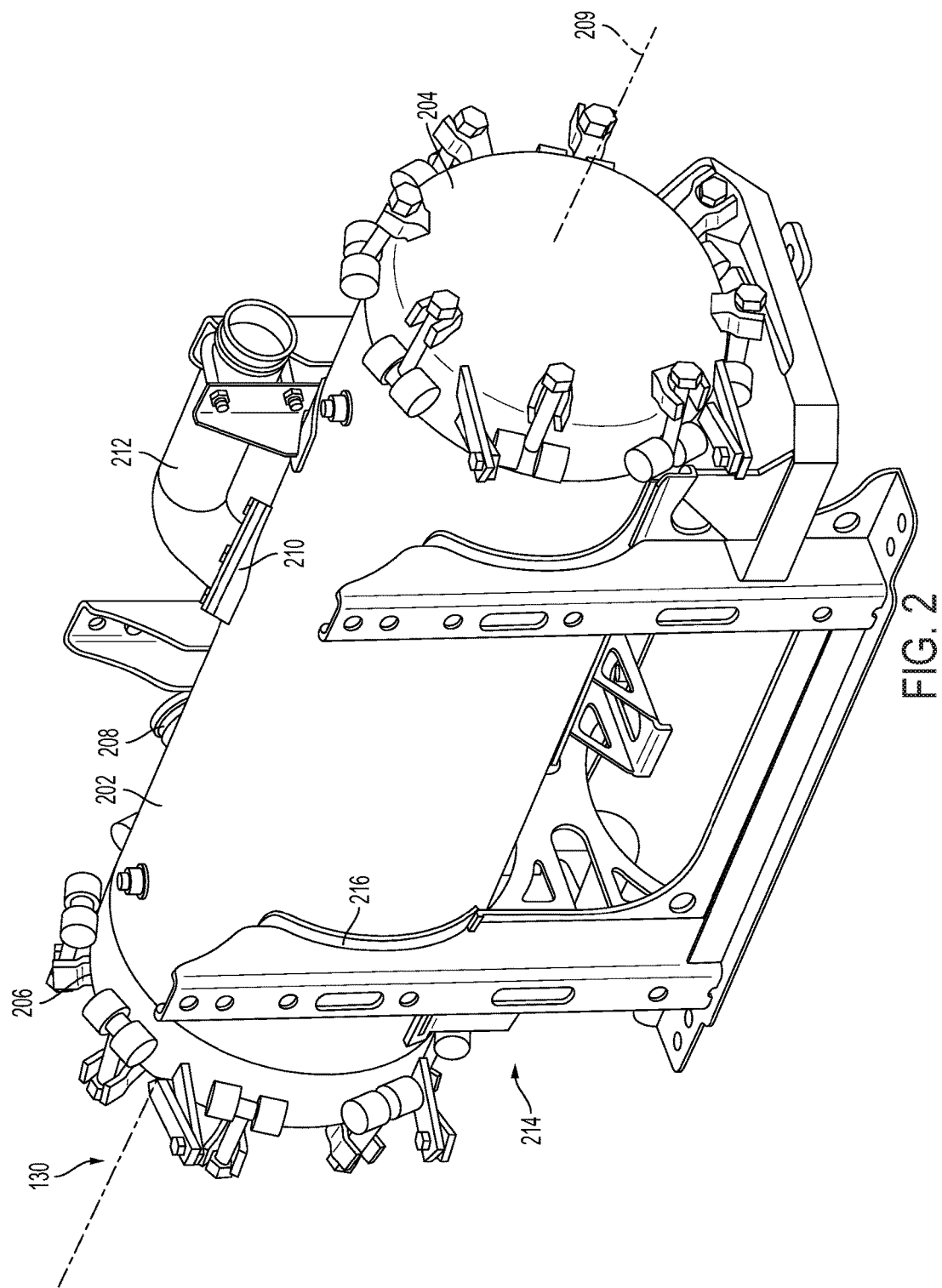
FIGS. 2-11 show the oil filter of FIG. 1 in combination with a support frame.
Figure 3:
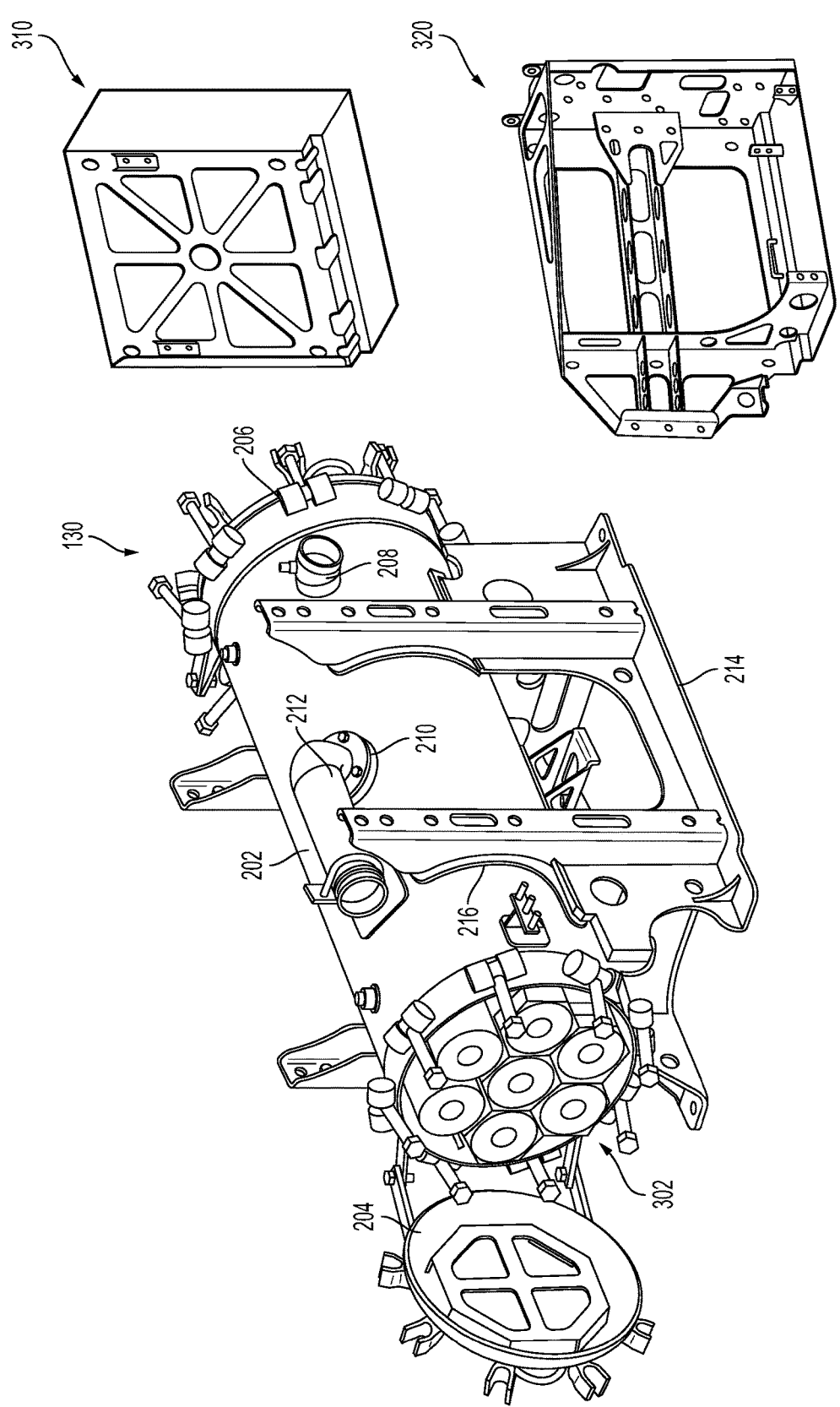

Turning now to FIGS. 2-3, an embodiment of a system including an oil filter 130 is illustrated in a left perspective view (FIG. 2) and a right perspective view (FIG. 3). Oil filter 130 includes an oil filter housing 202. The oil filter housing is a hollow cylinder or tube within which a plurality of oil filter elements 302 (shown in FIG. 3) are positioned. The oil filter housing includes a central axis 209 that extends parallel to the longitudinal axis of the oil filter housing and is positioned in the center of the housing. An oil inlet 208, extending outwardly from an external surface of the oil filter housing, is positioned near one end of the oil filter housing. Oil may flow into the oil inlet, through the oil filter elements within the oil filter, and then exit the oil filter through an oil outlet 210. The oil outlet is positioned centrally along the longitudinal (e.g., horizontal) axis of the oil filter. The oil outlet comprises a cylindrical tube 212 which extends outwardly from the external surface of the oil filter housing. The cylindrical tube of the oil outlet includes a 90 degree bend, so that the tube of the oil outlet is parallel with the horizontal axis. Additional detail regarding the oil filter elements will be presented below with respect to FIGS. 9-11.

The oil filter has two filter engagement surfaces or doors positioned at either end of the oil filter housing, including a first door 204 and a second door 206. The first door is arranged on a front side of the oil filter housing proximate the oil outlet, such that oil directed out of the oil filter through the oil outlet tube passes over the first door. The second door is arranged on the back side (e.g., opposite the front side) of the housing. The doors are sealable to the ends of the oil filter housing, at an engagement ring, for example, with a plurality of fasteners (e.g., screws, bolts) positioned around the circumference of each door. In one embodiment, the engagement ring may comprise a plurality of mounting brackets for fastening the door to the oil filter housing. The doors may be sealable to the ends of the oil filter housing such that no air or fluid may pass into or out of the oil filter through the doors when the doors are closed or sealed to the oil filter housing. In one embodiment, the doors may be seep-drawn closure doors.

Thus, in one embodiment, the oil filter system includes a first door coupled to a first open end of the housing and a second door coupled to a second open end of the housing, each door movably coupled to the housing via a respective set of hinges. Each open end of the housing includes an engagement ring configured to contact a respective engagement surface of the first door and the second door. The oil filter system further includes a first set of locking members to maintain the first door in contact with the housing and a second set of locking members to maintain the second door in contact with the housing.

The oil filter system includes a frame 214. The frame may provide support to the oil filter (e.g., prevent/protect from movement and/or vibration) and allow for mounting of the oil filter to a desired vehicle structure. Further, the frame may include mountings to couple various vehicle sub-assemblies to the oil filter. FIG. 3 illustrates two frame sub-assemblies that may be mounted to the frame, including a first frame sub-assembly 310 and a second frame sub-assembly 320. Each frame sub-assembly may house a suitable vehicle sub-assembly. In one embodiment, a fuel sub-assembly may be mounted to one side of the frame via the second frame sub-assembly, and an oil cooler may be mounted to the other side of the frame via the first frame sub-assembly. Additional detail regarding the mounting of the vehicle sub-assemblies to the oil filter will be provided below with respect to FIGS. 12-18. Positioned between the frame and the oil filter housing is a set of saddles 216, e.g., sheet metal saddles. The sheet metal saddles prevent stress concentration from the fillet welds from being reacted onto the oil filter housing, which is a pressure vessel and thus may become degraded and leak oil, for example, if stress were to be applied onto the housing.

As mentioned above, the frame may be integrated with the oil filter housing. Thus, the frame and housing may be a single component. In other embodiments, the frame may be coupled to the housing of the oil filter in a suitable manner, such as fastened (e.g., with bolts), welded, adhered with an adhesive, etc. The frame may be in face-sharing contact (e.g., directly contacting) with the oil filter housing. In some embodiments, the frame may contact the housing of the oil filter, but may not be permanently or removably fixed to the housing. The frame may be shaped to receive the oil filter, e.g., have concave curvature in the region that contacts the convex curvature of the oil filter. The frame may be comprised of a suitable material, such as stainless steel or other steel, aluminum, or other suitable material. Additional detail regarding the structure of the frame in combination with the oil filter will be provided below with respect to FIGS. 4-11.

Figure 4:
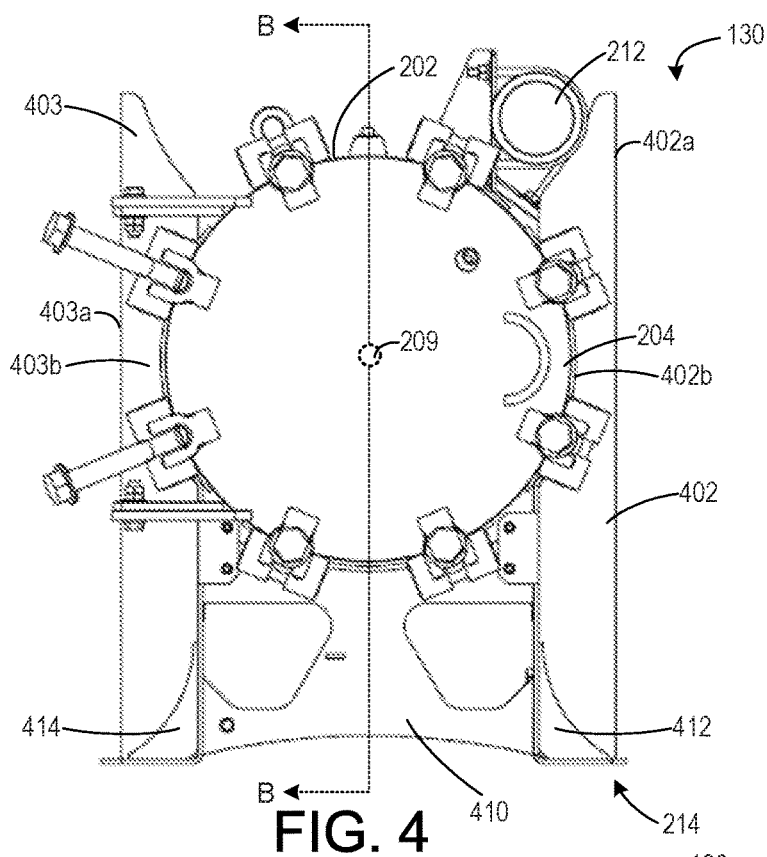
Figure 5:
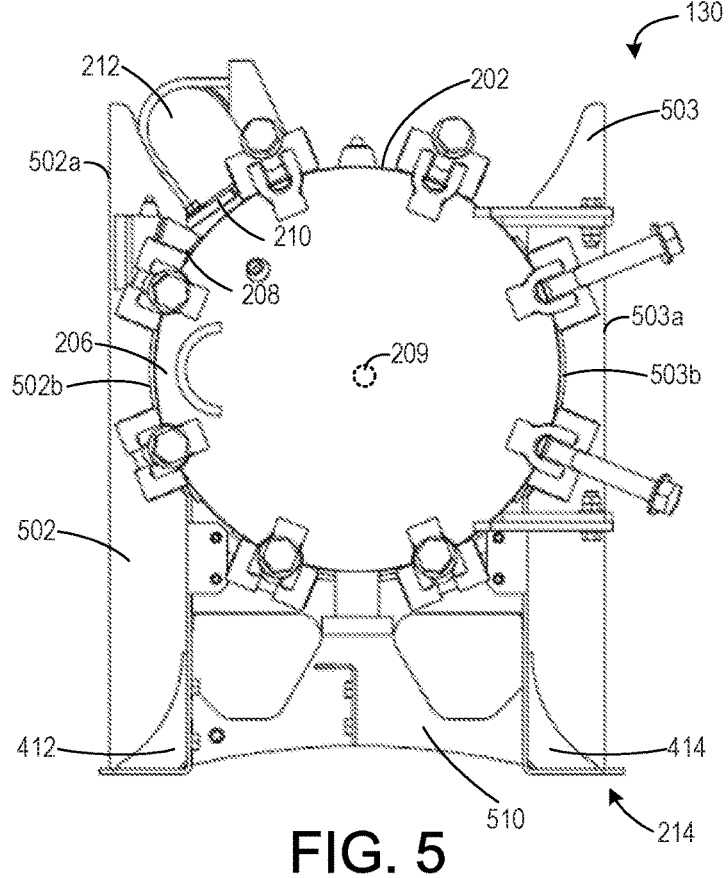
Figure 6:
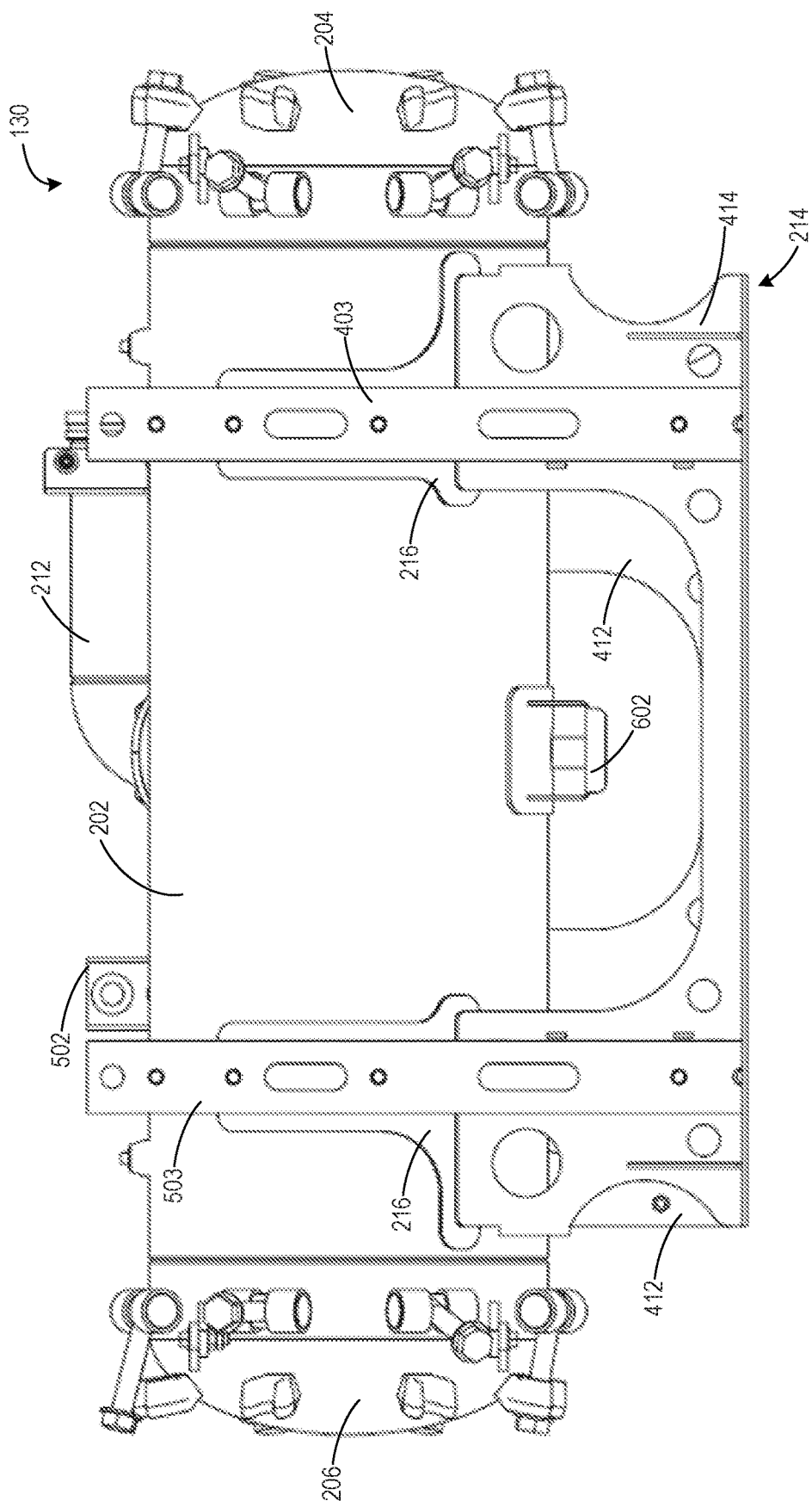
Figure 7:
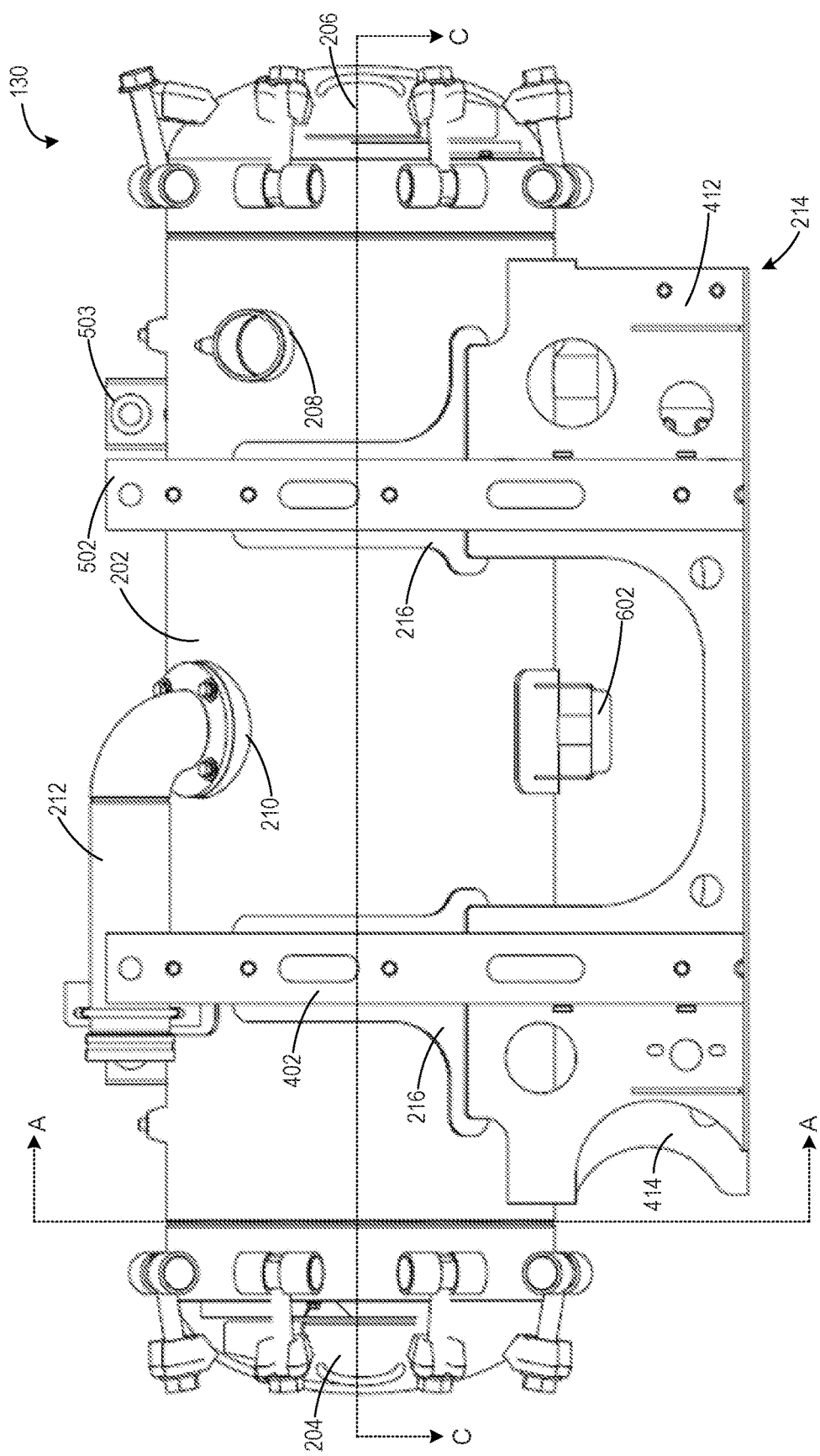
Figure 8A:
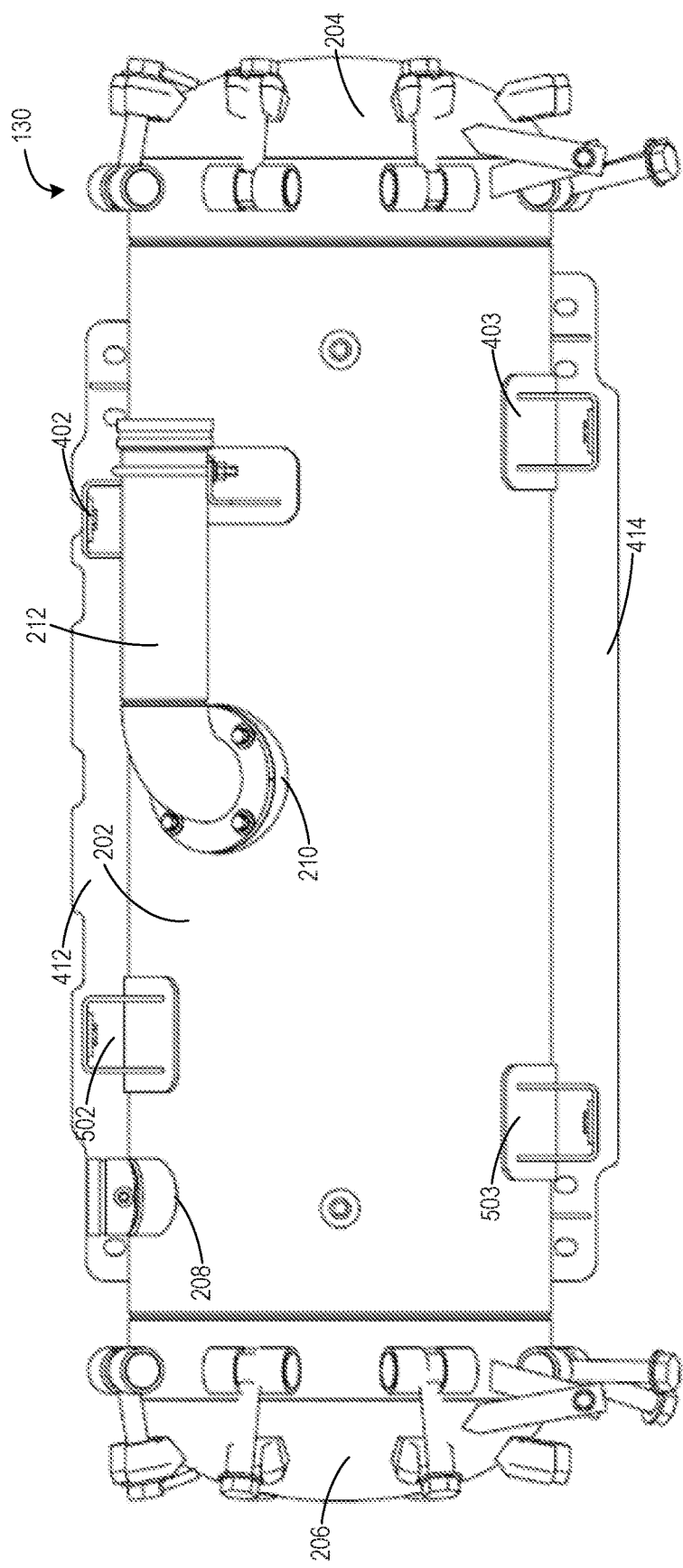
Figure 8B:
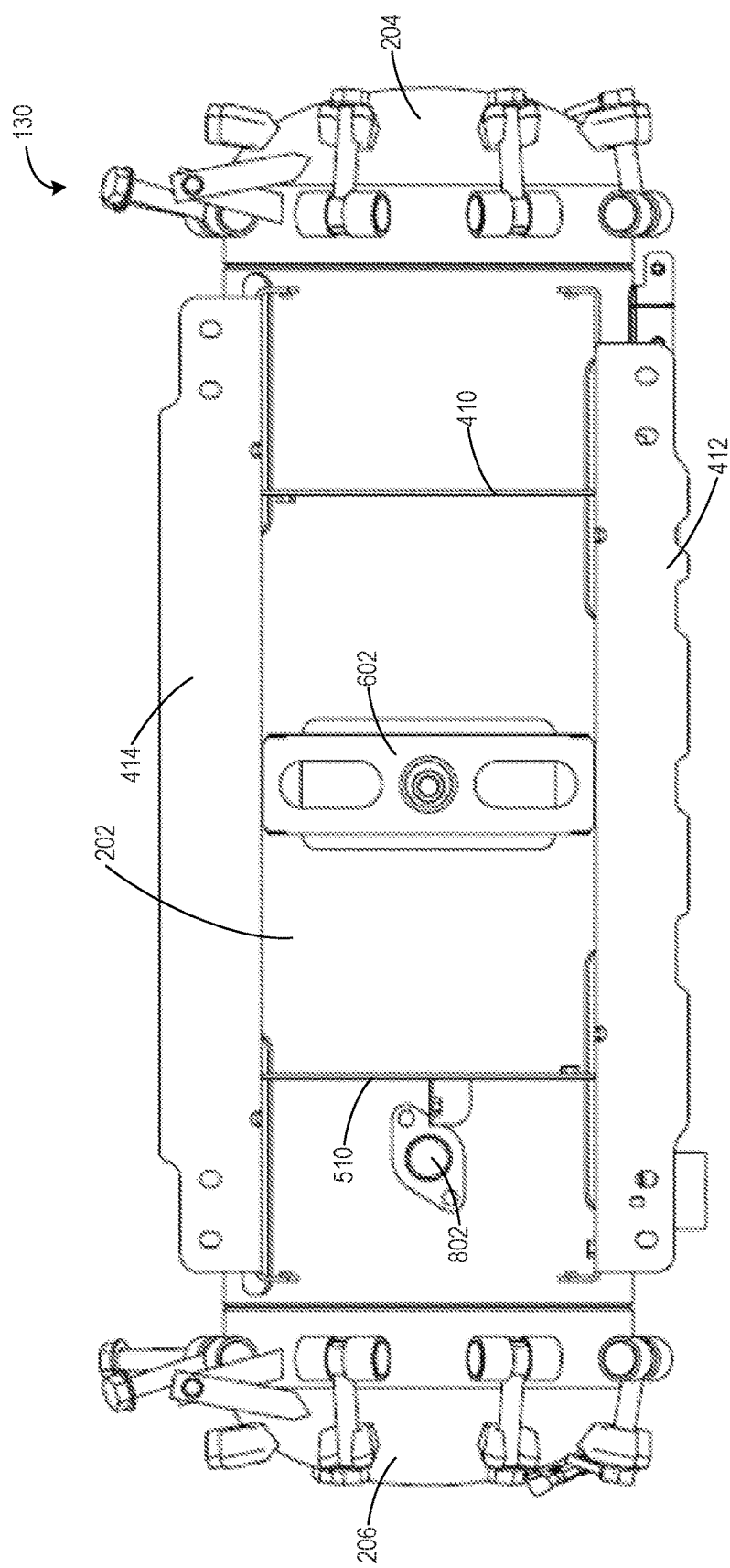

The frame and oil filter housing will be described collectively with respect to FIGS. 4-8. FIG. 4 is a head-on view of the oil filter from a front side. FIG. 5 is a head-on view of the oil filter from a back side. FIG. 6 is a side view of a first, left side of the oil filter. FIG. 7 is a side view of a second, right side of the oil filter. FIG. 8A is a top view of the oil filter and FIG. 8B is a bottom view.

As explained above, the oil filter 130 includes a hollow cylindrical housing 202 configured to hold a plurality of oil filter elements. Each end of the housing includes a door to seal the oil filter. FIG. 4 illustrates first door 204 while FIG. 5 illustrates second door 206. Further, the central axis 209 of the housing is illustrated schematically in FIGS. 4 and 5. Each door may be opened to replace, clean, service, etc., the oil filter elements in the oil filter. Unfiltered oil enters into the oil filter via oil inlet 208, and filtered oil exits out of the oil filter at oil outlet 210, which is coupled to cylindrical tube 212. Filtered oil may travel through the cylindrical tube en route to downstream components, such as an oil cooler, the engine, etc.

The frame 214 of the oil filter comprises two sets of support arms. The first set of support arms 403, 503 is positioned on a first side of the oil filter housing with respect it the central axis, and a second set of support arms 402, 502 is positioned on a second side of the oil filter housing, where the second side is opposite the first side with respect the central axis. For example, the first side may be the left side of the housing and the second side may be the right side of the housing. The support arms extend from a bottom of the frame and along a portion of the oil filter housing, and terminate at a position above the oil filter housing. Each of the support arms may be parallel to each other and perpendicular to a longitudinal axis of the oil filter housing. Each support arm may have a first side that faces away from the oil filter housing that is substantially straight, and a second side that faces toward the oil filter housing that is curved to accommodate the oil filter housing. The second side of each support arm may be face-sharing contact (e.g., directly contacting) with the oil filter housing along a portion of the second side.

The first set of support arms includes a first front arm 403 and a first back arm 503. The first front arm may be positioned relatively proximate the front side of the oil filter and the front door of the oil filter. The first back arm may be positioned relatively proximate the back side and back door of the oil filter. Each of the first front arm and first back arm may be positioned a suitable distance from the respective oil filter door and a suitable distance from each other. As illustrated, the distance separating the first front arm and the first back arm may be greater than a distance between the oil filter housing-door interface and the respective support arm. Each of the first (front) door and second (back) door may swing open towards the first set of support arms. Each arm of the first set of support arms may be comprised of a single continuous piece of material, or one or both of the arms may be comprised of two or more pieces of material coupled (e.g., bolted, welded, etc.) together. Each arm of the first set of support arms includes one or more openings to facilitate mounting of a frame sub-assembly. The first front arm includes a straight surface 403a and a curved surface 403b opposite the straight surface. The curved surface may have a curvature complimentary to the curvature of the housing and may be contact with the housing and/or with an intervening saddle. Likewise, first back arm includes a straight surface 503a and a curved surface 503b opposite the straight surface. The curved surface may have a curvature complimentary to the curvature of the housing and may be contact with the housing and/or with an intervening saddle. The straight surface 403a and the straight surface 503a may be located in the same plane.

The second set of support arms includes a second front arm 402 and a second back arm 502. The second front arm may be positioned relatively proximate the front side of the oil filter and the front door of the oil filter. The second back arm may be positioned relatively proximate the back side and back door of the oil filter. Each of the second front arm and second back arm may be positioned a suitable distance from the respective oil filter door and a suitable distance from each other. As illustrated, the distance separating the second front arm and the second back arm may be greater than a distance between the oil filter housing-door interface and the respective support arm. Each of the first (front) door and second (back) door may swing open away the second set of support arms. Each arm of the second set of support arms may be comprised of a single continuous piece of material, or one or both of the arms may be comprised of two or more pieces of material coupled (e.g., bolted, welded, etc.) together. Each arm of the second set of support arms includes one or more openings to facilitate mounting of a frame sub-assembly. The second front arm may be positioned proximate the oil outlet and cylindrical tube. The second front arm may be in contact with the oil outlet/cylindrical tube to provide support to the cylindrical tube. The second front arm includes a straight surface 402a and a curved surface 402b opposite the straight surface. The curved surface may have a curvature complimentary to the curvature of the housing and may be contact with the housing and/or with an intervening saddle. Likewise, second back arm includes a straight surface 502a and a curved surface 502b opposite the straight surface. The curved surface may have a curvature complimentary to the curvature of the housing and may be contact with the housing and/or with an intervening saddle. The straight surface 402a and the straight surface 502a may be located in the same plane.

Each of the support arms may terminate at a coupling to a respective side support plate of the frame. The first set of support arms may be coupled to a first side support plate 414, while the second set of support arms may be coupled to a second side support plate 412. The first side support plate may extend along the first (e.g., left) side of the oil filter housing, while the second side support plate may extend along the second (e.g., right) side of the oil filter housing. Each of the side support plates may include various cut-outs, openings, or other sub-structures. Further, each of the side support plates may be in face-sharing (e.g., directly contacting) contact with the oil filter housing along a top side of each respective side support plate.

Each side support plate is coupled to two bottom support plates, including a front bottom support plate 410 and a back bottom support plate 510. (The bottom support plates may be referred to as brackets in some examples.) The front bottom support plate may span a width of the frame (e.g., may be coupled across the oil filter housing), underneath the oil filter housing, from the first side support plate to the second side support plate, and may be located proximate the first front support arm and the second front support arm. In some embodiments, the front bottom support plate may be in face-sharing contact with a portion of the oil filter housing (e.g., directly contacting), while in other embodiments a gap may be present between the front bottom support plate and the oil filter housing.

The back bottom support plate may span a width of the frame (e.g., may be coupled across the oil filter housing), underneath the oil filter housing, from the first side support plate to the second side support plate, and may be located proximate the first back support arm and the second back support arm. In some embodiments, the back bottom support plate may be in face-sharing contact with a portion of the oil filter housing (e.g., directly contacting), while in other embodiments a gap may be present between the back bottom support plate and the oil filter housing. Each of the front and back bottom support plates may include cut-outs, openings, mountings, or other sub-structures.

In some embodiments, the first front support arm and the front bottom support plate may couple to the first side support plate at a common location. Likewise, in some embodiments, the second front support arm and the front bottom support plate may couple to the second side support plate a common location.

In some embodiments, the first back support arm and the back bottom support plate may couple to the first side support plate at a common location. Likewise, in some embodiments, the second back support arm and the back bottom support plate may couple to the second side support plate a common location.

However, as will be appreciated in FIG. 8A, the second set of support arms (arms 402 and 502) may be spaced closer together than the first set of support arms (arms 403 and 503), and thus the first set of support arms may be spaced apart more than the second set of support arms. Thus, the front bottom support plate and back bottom support plate may not couple to the first side support plate and second side support plate at common locations with all the respective support arms. Rather, in some embodiments the front and back bottom support plates may couple to the first side support plate at a common location with the first set of support arms (arms 503 and 403) while couple to the second side support plate at locations offset from the second set of support arms.

In some embodiments, the frame may also include a middle brace 602 positioned under the oil filter housing and between the front and back bottom support plates. The middle brace may be coupled to each of the front and back bottom support plates. Further, in some embodiments a dirty side oil drain 802 may be present on the bottom of the oil filter housing, as shown in FIG. 8B.

Figure 9:
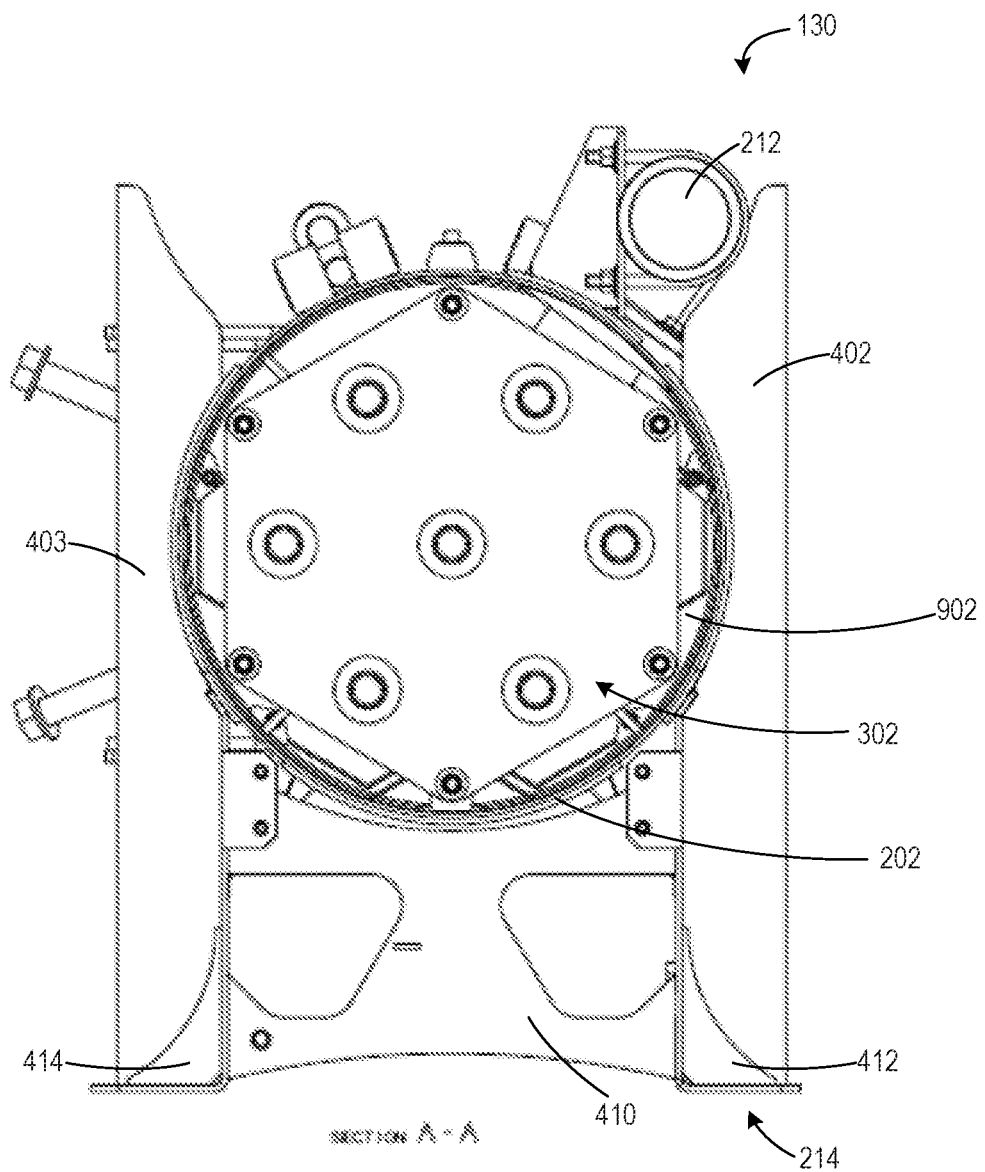
Figure 10:
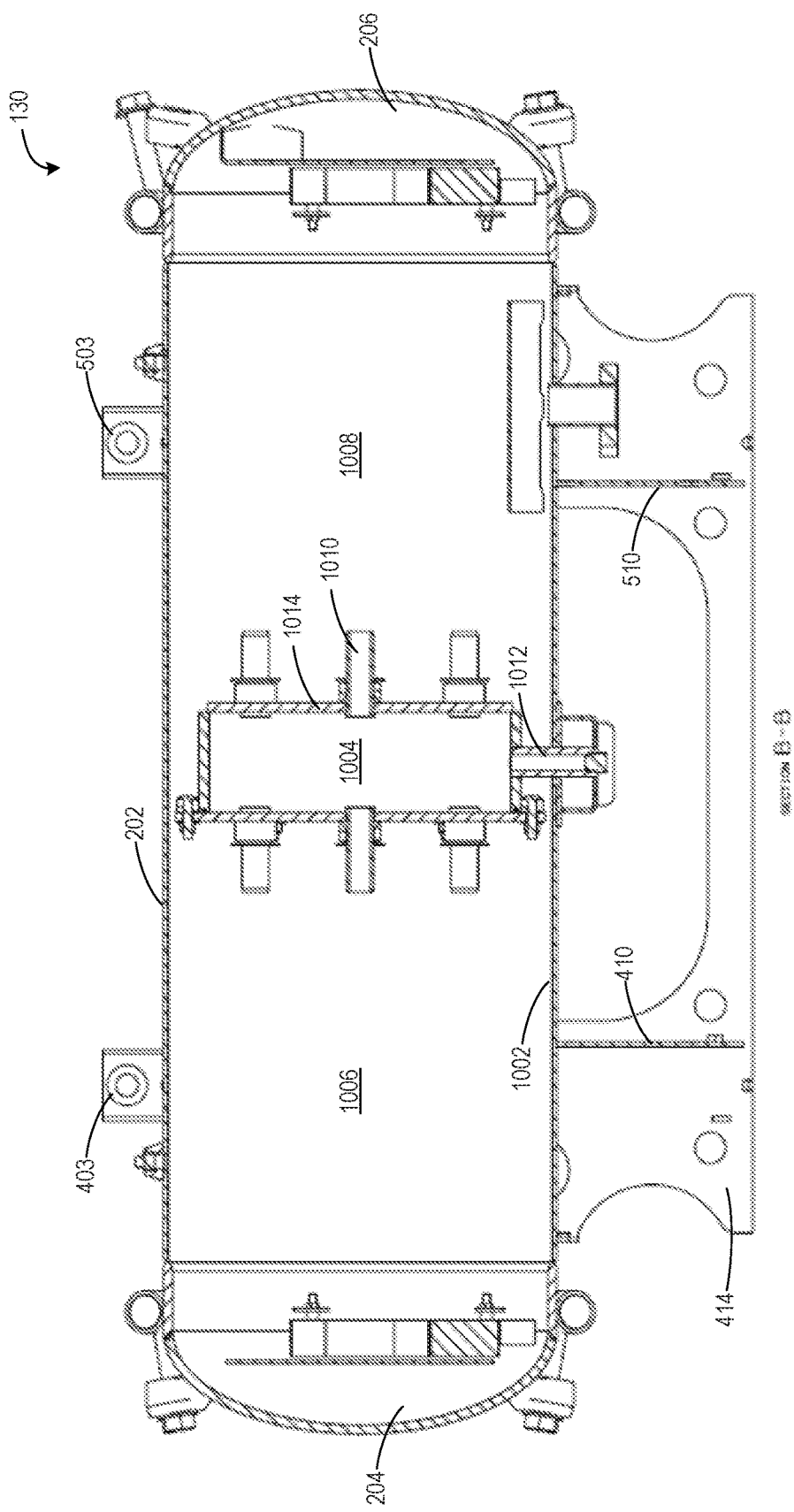
Figure 11:
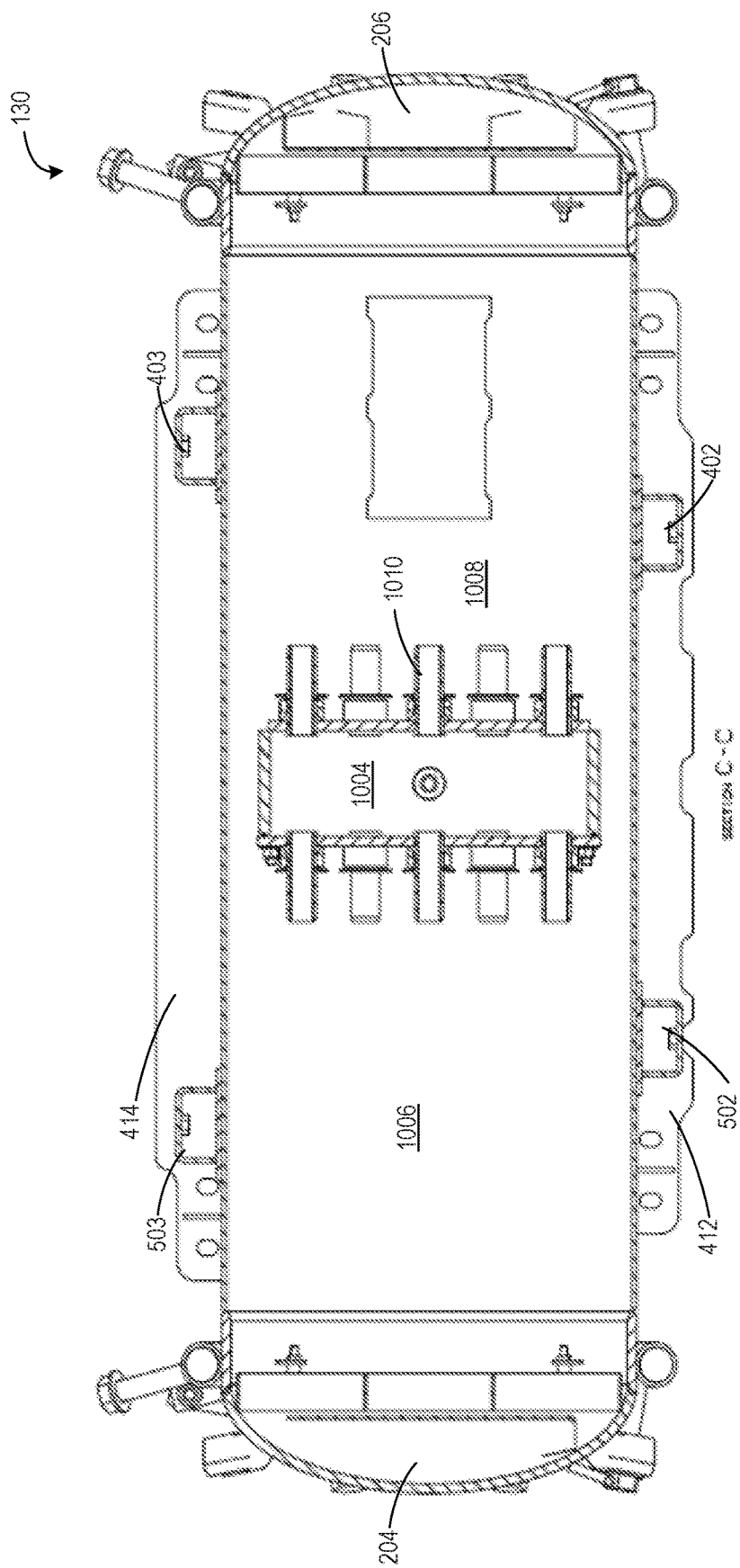

Turning now to FIGS. 9-11, various cross-sectional views of the oil filter 130 are illustrated. FIG. 9 is a first cross-sectional view taken from section A-A shown in FIG. 7. First front support arm 403, second front support arm 402, front bottom support plate 410, first side support plate 414, and second side support plate 412 of frame 214 are illustrated in the cross-sectional view of FIG. 9. Further, the interior 902 of the oil filter is also illustrated, including a plurality of filter elements 302.

FIG. 10 is a second cross-sectional view of the oil filter 130 take from section B-B shown in FIG. 4. The first set of support arms (arms 403 and 503), first (e.g., front) door 204, second (e.g., back) door 206, and first side support plate 414 are illustrated in FIG. 10. Further, the front bottom support plate 410 and back bottom support plate 510 are illustrated in cross-section.

As described previously, the oil filter housing 202, in an embodiment, is a hollow tube. (The tube may be cylindrical, or have some other shape, e.g., oval or square in cross section, that defines a hollow, elongate interior that is shaped to receive one or more filter elements.) As shown in FIG. 10, the oil filter housing includes an oil filter housing wall 1002. The inside of the oil filter (e.g., inside the oil filter housing) may be split up into two cavity portions with a central oil passage 1004. A first cavity 1006 is formed by the oil filter housing wall, one of the engagement surfaces or doors, and the central oil passage. A second cavity 1008 is formed by the oil filter housing wall, the opposite door, and the central oil passage. As shown in FIGS. 3 and 9, seven oil filter elements may be positioned in each cavity of the oil filter. In this way, the oil filter may contain fourteen oil filter elements in total. In other embodiments, the oil filter may include more or less than fourteen oil filter elements.

The central oil passage comprises a hollow cylinder positioned centrally along the longitudinal axis of the oil filter. The central oil passage includes a fluid opening which allows oil to pass from the interior cavity of the central oil passage to the oil outlet.

Each oil filter element may be annular shaped with a cylindrical bore centered along a longitudinal axis of the oil filter element. The oil filter element comprises a porous material, wherein the porous material may be one or more of a cellulose media or a fibrous media, for example. The pores of the oil filter element allow oil to pass through the filter element while entraining larger particles and/or impurities suspended in the oil. These particles may be too large to pass through the pores, thereby causing them to remain within the porous material of the oil filter element. As such, a smaller pore size of the porous media may allow more particles to be removed from the engine oil.

Engine oil may flow from a supply source (e.g., the engine) into the oil filter through the oil inlet. Engine oil passes through the porous material of the oil filter element and into the cylindrical bore. Engine oil then flows through the bore toward the central oil passage. Each filter element may be coupled to a respective cylindrical projecting tube (such as cylindrical projecting tube 1010), which allows engine oil to flow from the cylindrical bore of the oil filter element to the interior cavity of the central oil passage. Engine oil then flows through the cavity of the central oil passage and out the fluid opening to the oil outlet. Filtered oil may then return to the engine.

In some embodiments, a clean side oil drain 1012 may be present in the central oil passage. The drain may allow excess oil to drain out of the oil filter and collect in a sump (e.g., oil pan) under the oil filter, for example. The clean side drain may used if a catastrophic failure of filter were to occur, then the clean side of the oil filter housing may be compromised. This clean side oil drain may have a magnet drain plug that can be checked for metallic fragments. If it does have metallic fragments then the clean chamber would need cleaned out. A removable cover 1014 can be taken off to give access to the clean chamber (central oil passage 1004). This allows canister to be re-used without risk of future cleanliness issues of the engine.

FIG. 11 is a third cross-sectional view of the oil filter 130 take from section C-C shown in FIG. 7. The first set of support arms (arms 403 and 503), second set of support arms (arms 402 and 502), first (e.g., front) door 204, second (e.g., back) door 206, first side support plate 414, and second side support plate 412 are illustrated in FIG. 11. Further, the various oil cavities and passages of the oil filter (including first cavity 1006, second cavity 1008, and central oil passage 1004) are illustrated, along with the projecting tubes configured to couple to the plurality of filter elements (including projecting tube 1010).

Figure 12:
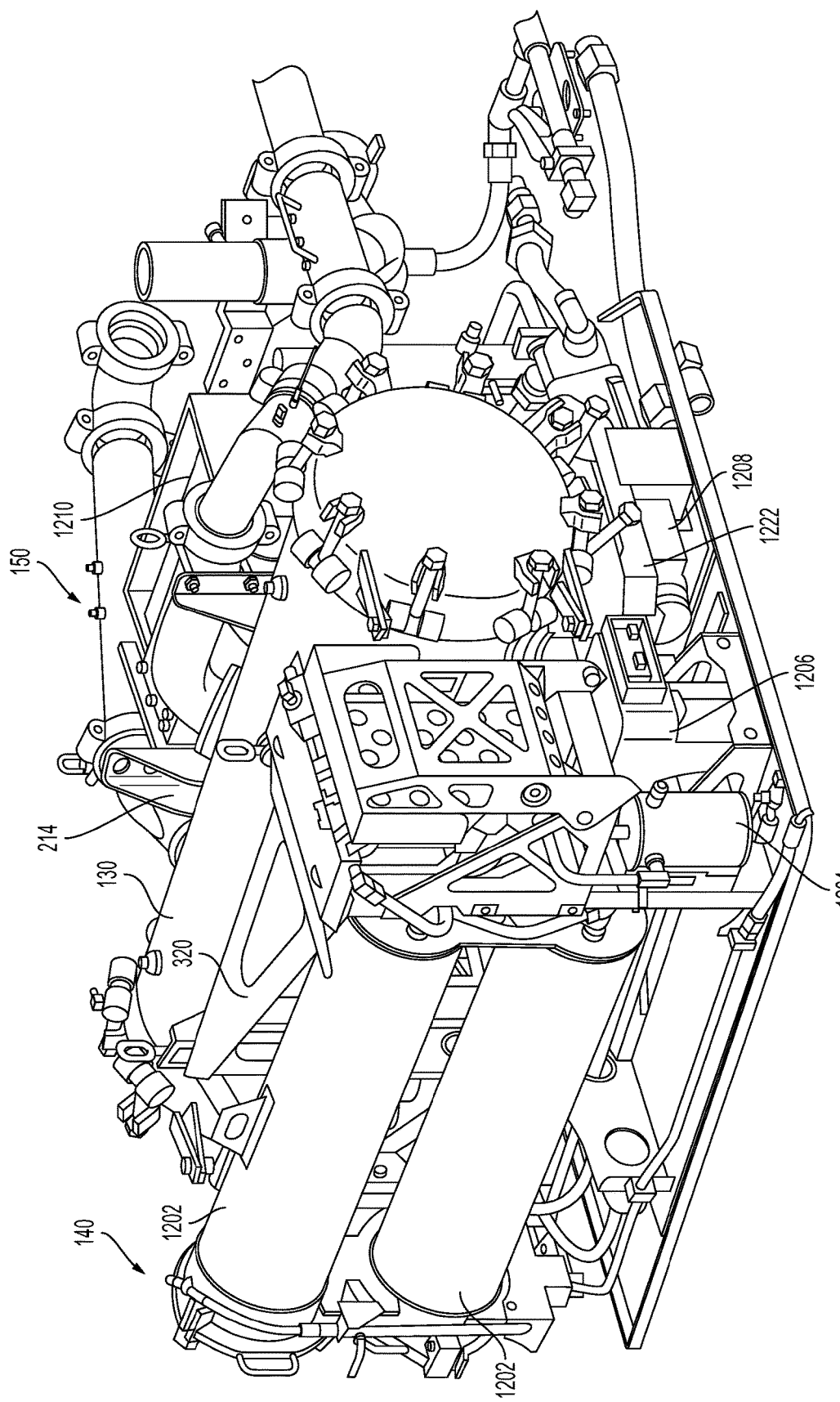
FIGS. 12-18 show the oil filter and frame of FIGS. 1-11 in combination with a fuel sub-assembly and an oil cooler sub-assembly.
Figure 13:
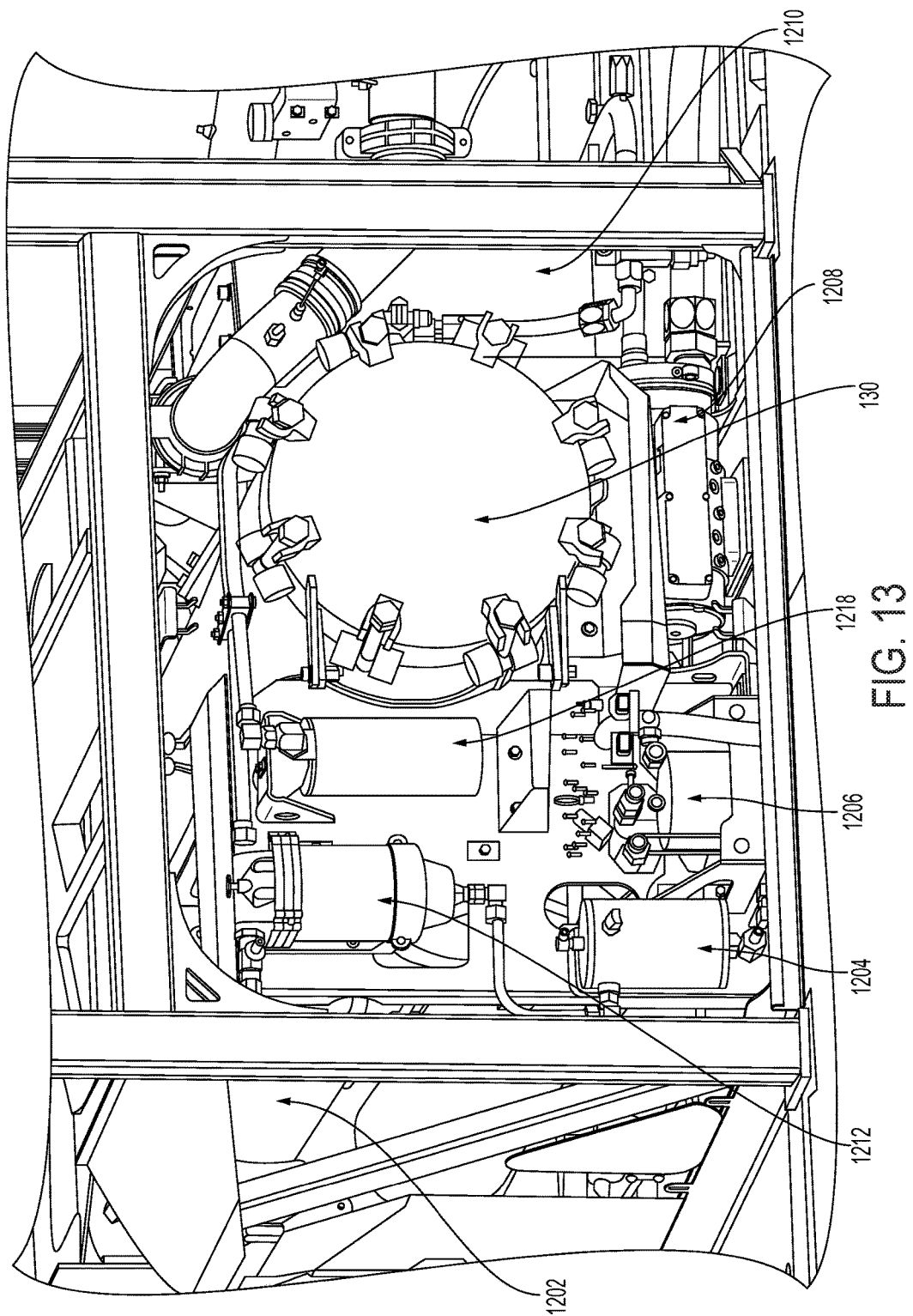
Figure 14:
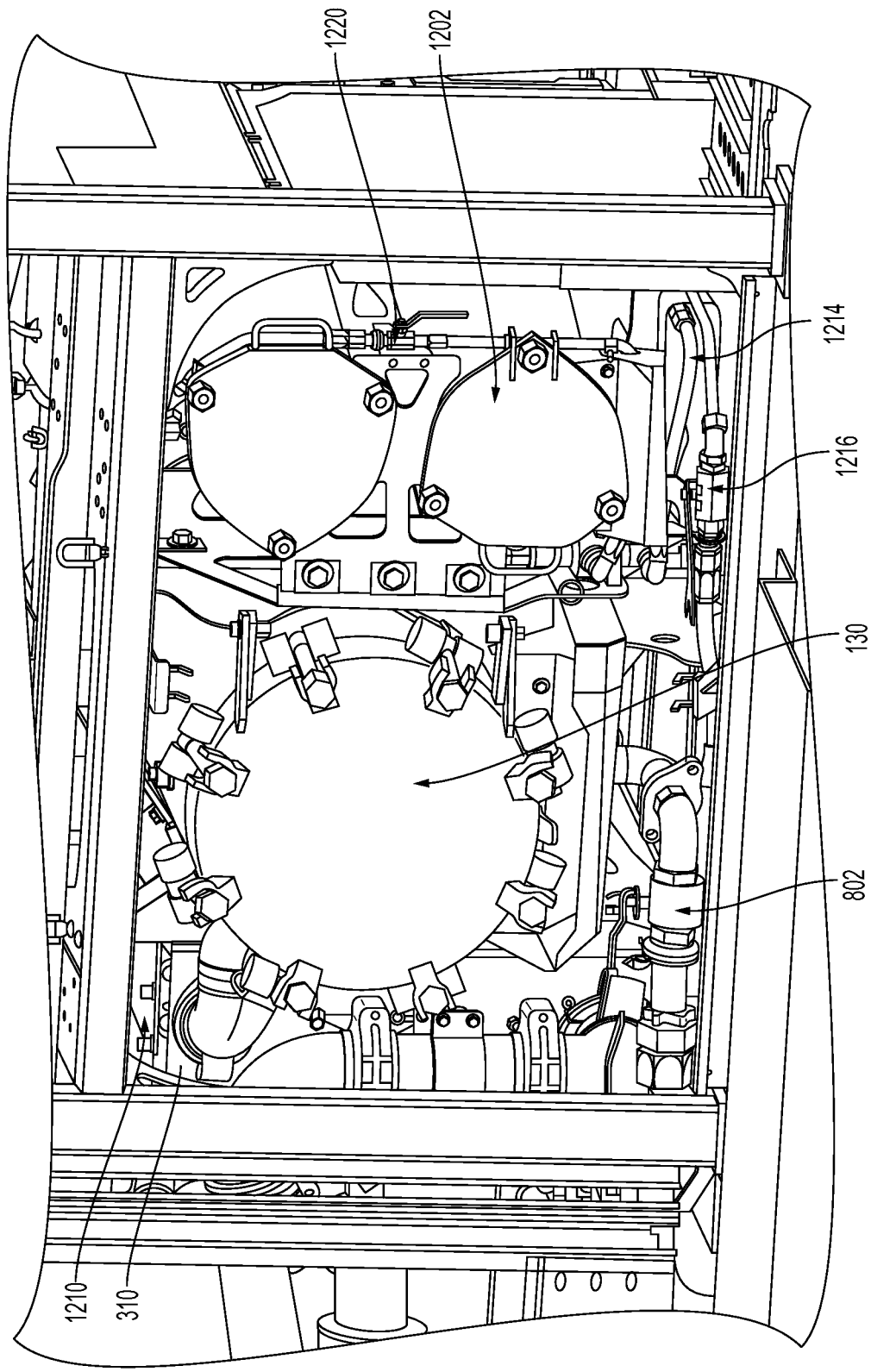
Figure 15:
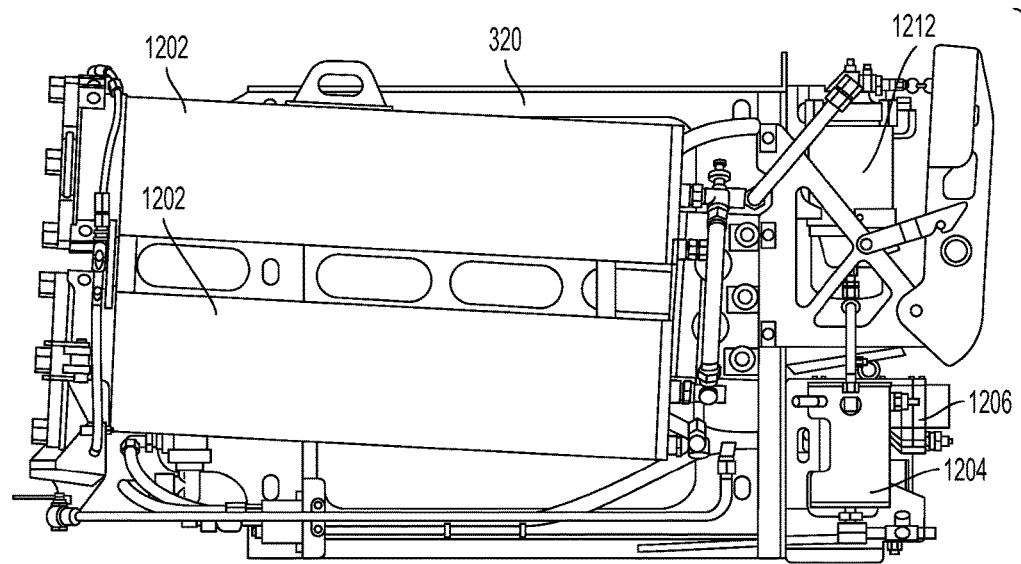
Figure 15:
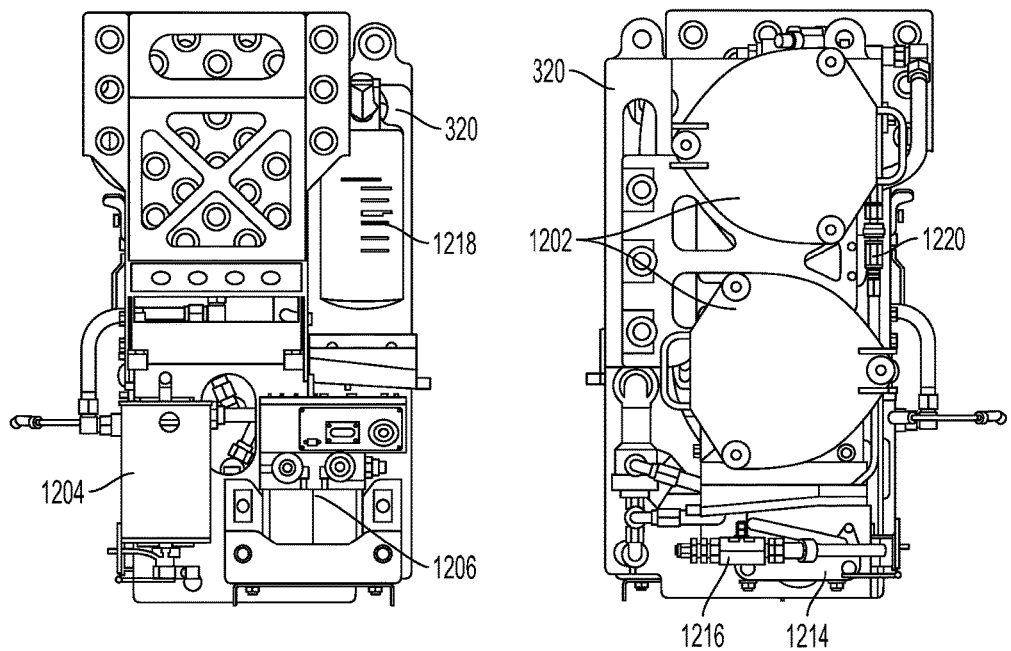
Figure 16:
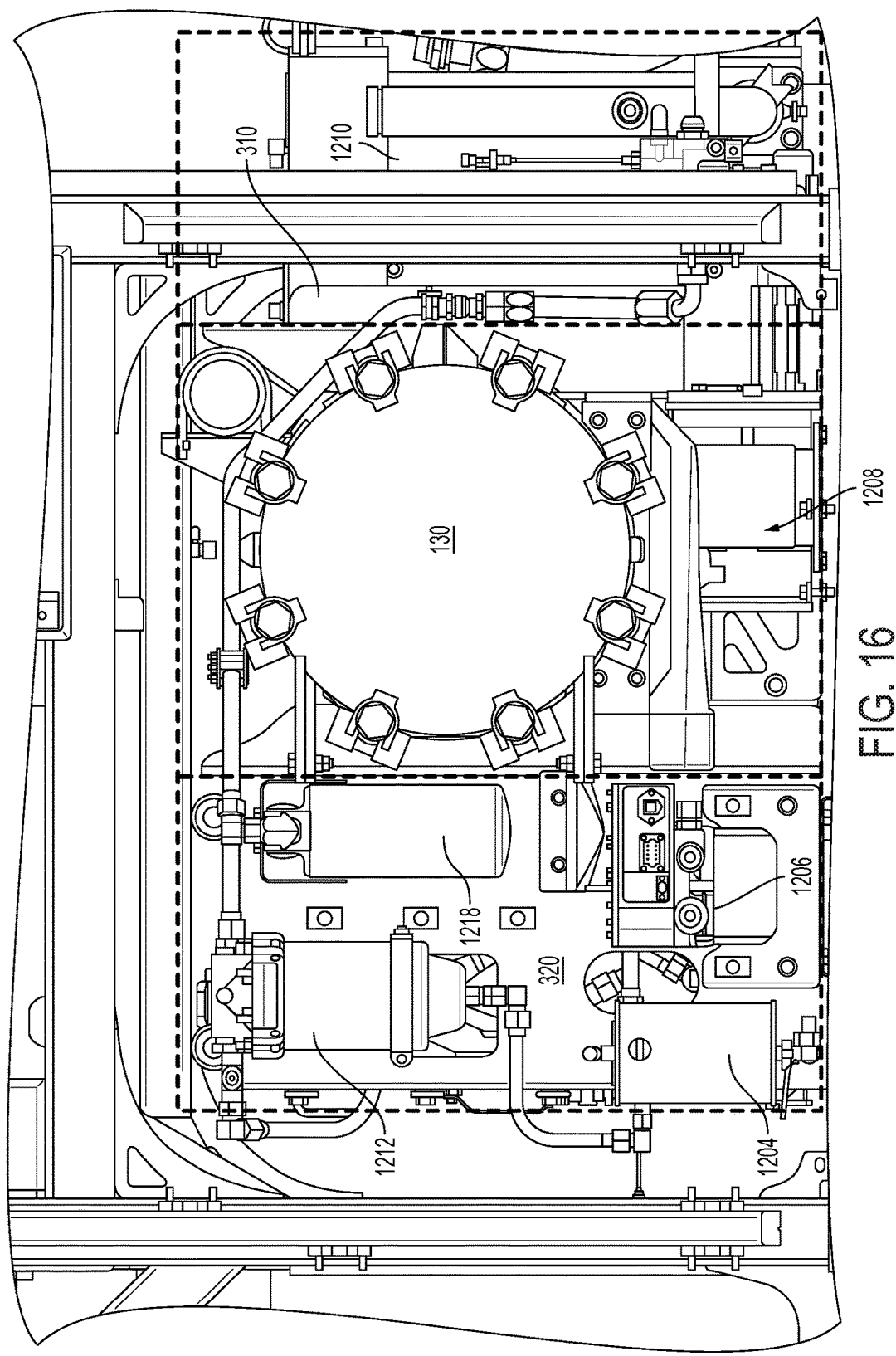
Figure 17:
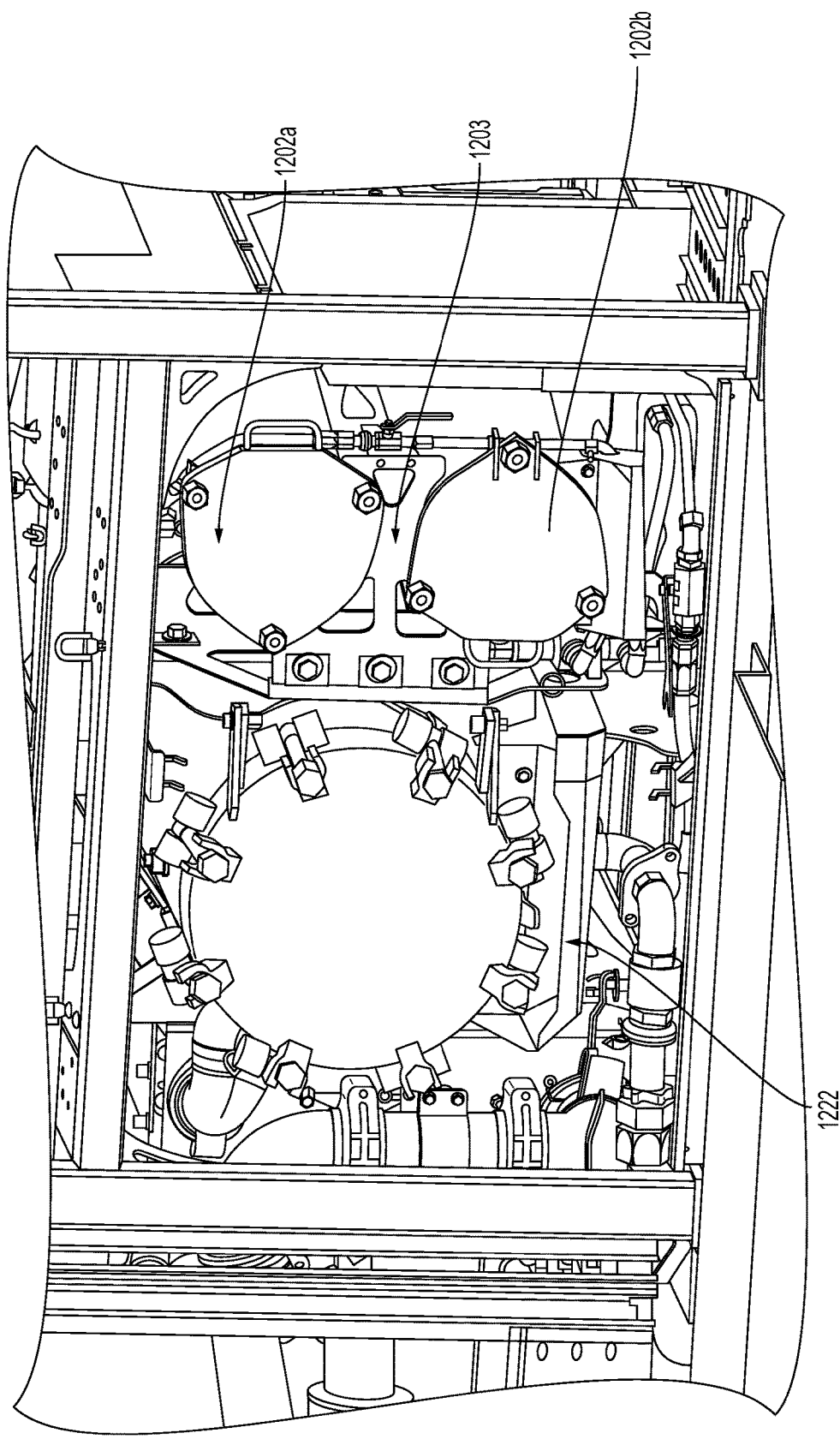
Figure 18:
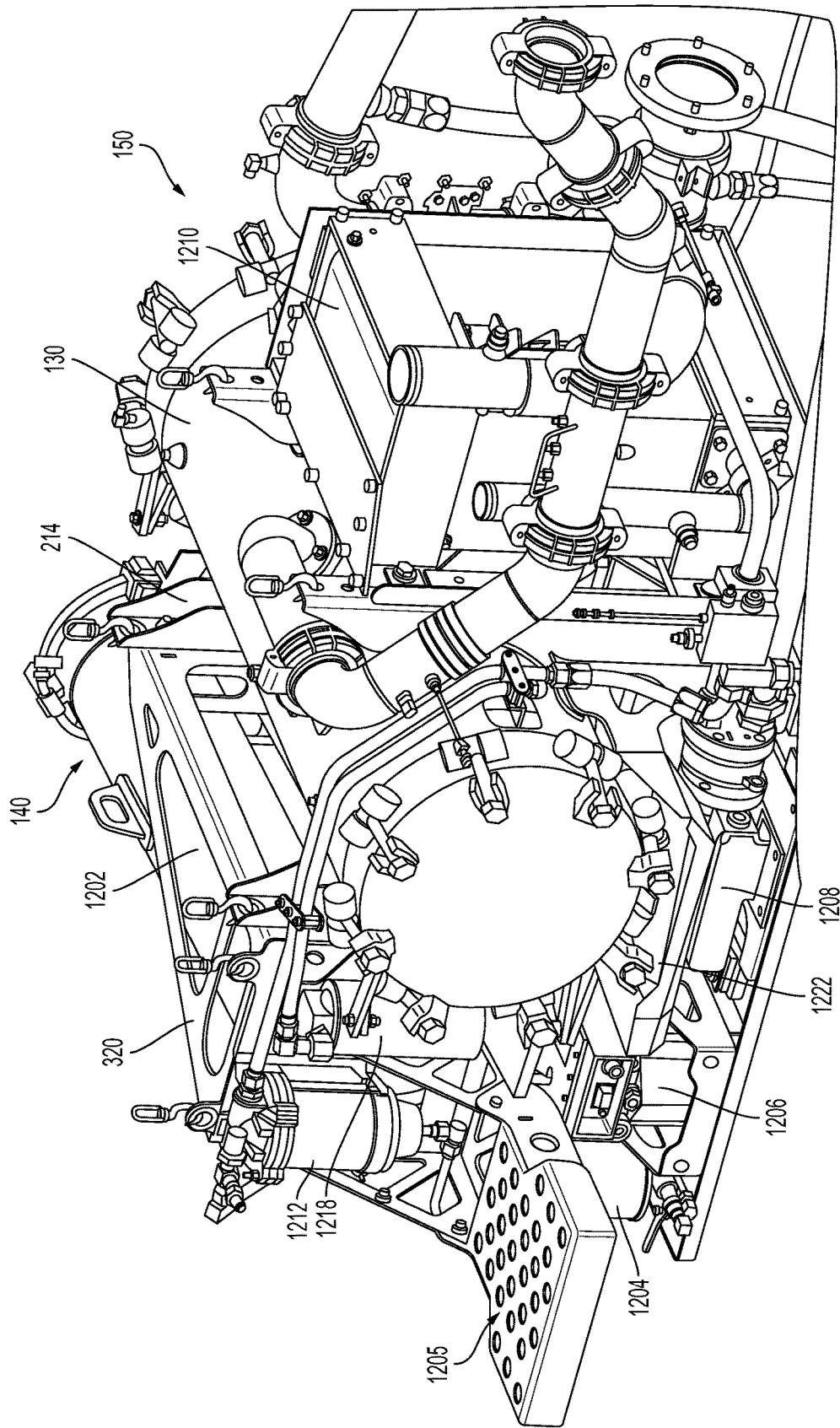

As explained above, the oil filter may be coupled to one or more vehicle sub-assemblies via the frame. FIGS. 12-18 illustrate various embodiments of an oil filter system having and oil filter (such as described in regards to any of FIGS. 1-11) coupled to a fuel sub-assembly and an oil cooler via the frame and frame sub-assemblies described above. FIGS. 12-18 are described collectively, and illustrate the oil filter 130, fuel sub-assembly 140, and oil cooler sub-assembly 150 coupled together via frame 214, first frame sub-assembly 310, and second frame sub-assembly 320. Specifically, FIG. 12 and FIG. 13 are front perspective views of an embodiment of an oil filter system, FIG. 14 is a rear perspective view of the oil filter system, FIG. 15 includes side and front views of sub-assemblies of the oil filter system, FIG. 16 is a front side elevation view of the oil filter system, and FIG. 17 and FIG. 18 are additional front perspective views of embodiments of the oil filter system.

The fuel sub-assembly includes a fuel filter 1202 (herein illustrated as two fuel filter stacked vertically), a fuel drain tank 1204, a fuel transfer pump 1206, a fuel water separator 1212, a fuel heater 1214, a fuel drain 1216, a fuel strainer 1218, and a fuel vent 1220. The components of the fuel sub-assembly are mounted to the frame of the oil filter via the second frame sub-assembly 320.

The oil cooler sub-assembly includes an oil cooler 1210 mounted to the frame of the oil filter via first frame sub-assembly 310. The oil cooler may be a suitable heat exchanger, such as a brazed heat exchanger (BHE), configured to transfer heat between oil and a thermal fluid, such as engine coolant.

Also shown in FIGS. 12-18 is a pre-lube pump 1208 and an oil pan 1222, positioned under the oil filter and configured to collect oil that drains out of the oil filter. The pre-lube pump may pump oil from the oil pan and/or oil filter to various engine components.

In this way, the fuel components may be consolidated into one sub-assembly. As shown in FIG. 17, the fuel filter doors 1202a and 1202b may be flipped relative to previous configurations, enabling the elimination of a "diaper door" and providing for an increased gap 1203 between the filter doors. The canisters of the fuel filter are also angled to improve drainage. In some embodiments, a step 1205 may be provided to improve access to the baggie filters, for example in front of the fuel-water separator. Further, the fuel heater may heat fuel via the oil in cold ambient conditions, and may prevent freezing of the fuel heater.

By packaging the oil filer, fuel sub-assembly, and oil cooler sub-assembly in the manner described above, lower costs may be obtained due to a smaller package size and weight reduction. For example, the entire assembly may be approximately 14 inches (35 cm) shorter than previous configurations, leaving increased space for a coalescer and optimizing a water inlet pipe. Further, the entire assembly may be approximately 175 pounds (80 kg) lighter than previous configurations. The configuration described herein may also provide for enhanced serviceability, due to increased fuel-water separator and pre-lube pump access as well as the positioning of the fuel filter drain and oil filter drain on the same side of the assembly.

An embodiment for an oil filter is provided. The oil filter comprises a housing. The housing comprises a hollow cylinder having a convex curvature. Within the housing, a plurality of oil filter elements are disposed. A frame supports the housing. The frame comprises two sets of support arms, each support arm having a first, straight side facing away from the oil filter housing and a second, curved side having a concave curvature in one or more regions that contact the convex curvature of the oil filter housing. The frame includes one or more mountings configured to support one or more vehicle sub-assemblies.

In an embodiment, the frame has a first set of mountings to couple to a first frame sub-assembly and a second set of mountings to couple to a second frame sub-assembly. The first frame sub-assembly is configured to couple a fuel sub-assembly to the frame, and the second frame sub-assembly is configured to couple an oil cooler sub-assembly to the frame. The frame may include a set of side support plates and a set of bottom support plates. A first side support plate may couple to a first set of the two sets of support arms, and a second side support plate may couple to a second set of the two sets of support arms. A first, front bottom support plate may couple to the first and second side support plates. A second, back bottom support plate may couple to the first and second side support plates.

In an embodiment, the frame is not, or is not part of, an engine block. In another embodiment, the frame is not part of the vehicle frame. The frame may be a separate support of the oil filter that may also be used to support other sub-assemblies.

Another embodiment relates to a system. The system comprises an oil filter comprising a housing within which are disposed a plurality of oil filter elements. The system also comprises a fuel sub-assembly and an oil cooler sub-assembly. The fuel sub-assembly comprises one or more of a fuel filter, a fuel drain tank, a fuel transfer pump, a fuel water separator, a fuel heater, a fuel drain, a fuel strainer, or a fuel vent. The oil-cooler sub-assembly comprises a brazed heat exchanger. The system further comprises a frame coupling the fuel sub-assembly and the oil cooler sub-assembly to the oil filter. In some embodiments, the frame is separate from an engine block and/or a vehicle frame.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. An oil filter system, comprising:
a housing comprising a hollow cylinder having a convex curvature and which is configured to receive a plurality of oil filter elements disposed therein; and
a frame supporting the housing, the frame comprising a first set of support arms and a second set of support arms, each support arm extending from a bottom of the frame and along a portion of the housing and terminating at a position above the housing, parallel to each other and perpendicular to a longitudinal axis of the housing, and having a first, straight side facing away from the housing and a second, curved side having a concave curvature in one or more regions that contact the convex curvature of the housing, and
the straight side of each support arm of the first set of support arms being located in a same first plane positioned on a first side of the housing with respect to the axis and the straight side of each support arm of the second set of support arms being located in a same second plane positioned on a second side of the housing with respect to the axis, each straight side of each support arm further comprising one or more mountings configured to support one or more vehicle sub-assemblies.

2. An oil filter system of comprising:
a housing comprising a hollow cylinder having a convex curvature and which is configured to receive a plurality of oil filter elements disposed therein; and
a frame supporting the housing, the frame comprising a first set of support arms and a second set of support arms, each support arm having a first, straight side facing away from the housing and a second, curved side having a concave curvature in one or more regions that contact the convex curvature of the housing, and
the straight side of each support arm of the first set of support arms being located in a same first plane, and the straight side of each support arm of the second set of support arms being located in a same second plane, each straight side of each support arm further comprising one or more mountings configured to support one or more vehicle sub-assemblies, wherein the one or more mountings of the straight sides of the support arms of the first set of support arms couple the frame to a first frame sub-assembly supporting a first vehicle sub-assembly and the one or more mountings of the straight sides of the support arms of the second set of support arms couple the frame to a second frame sub-assembly supporting a second vehicle sub-assembly.

3. The oil filter system of claim 2, wherein the first frame sub-assembly is configured to couple a fuel sub-assembly to the frame, and the second frame sub-assembly is configured to couple an oil cooler sub-assembly to the frame.

4. The oil filter system of claim 3, wherein the fuel sub-assembly comprises a fuel filter, a fuel drain tank, a fuel transfer pump, a fuel water separator, a fuel heater, a fuel drain, a fuel strainer, and a fuel vent.

5. The oil filter system of claim 3, wherein the oil cooler sub-assembly comprises a brazed heat exchanger.

6. The oil filter system of claim 3, wherein the oil filter system is configured to couple to a vehicle frame of a vehicle.

7. The oil filter system of claim 6, wherein the vehicle comprises an engine mounted on an engine block, the frame of the oil filter system separate from the engine block and the vehicle frame.

8. The oil filter system of claim 2, wherein the first set of support arms and the second set of support arms directly contact the housing.

9. The oil filter system of claim 2, wherein each support arm of the first set of support arms and the second set of support arms contacts the housing via a respective saddle.

10. An oil filter system, comprising:
a housing comprising a hollow cylinder having a convex curvature around a central axis and which is configured to receive a plurality of oil filter elements disposed therein; and
a frame supporting the housing, the frame comprising:
a first set of support arms on a first side of the frame relative to the central axis;
a second set of support arms on a second side of the frame, opposite the first side relative to the central axis; and
a first bottom bracket and a second bottom bracket positioned underneath and coupled across the housing, each support arm of the first set of support arms and second set of support arms having a first, straight side facing away from the housing and a second, curved side having a concave curvature in one or more regions that contact the convex curvature of the housing, and
the straight side of each support arm of the first set of support arms being located in a same first plane, and the straight side of each support arm of the second set of support arms being located in a same second plane, each straight side of each support arm further comprising one or more mountings configured to support one or more vehicle sub-assemblies.

11. The oil filter system of claim 10, wherein each support arm of the first set of support arms and the second set of support arms extends around and above the housing.

12. The oil filter system of claim 11, wherein the first set of support arms comprises a first front arm and a first back arm, and wherein the second set of support arms comprises a second front arm and a second back arm, the second front arm positioned proximate a cylindrical tube coupled to an oil outlet of the housing.

13. The oil filter system of claim 12, wherein the second front arm directly contacts and supports the cylindrical tube.

14. The oil filter system of claim 12, wherein the first set of support arms is spaced apart by a greater distance than the second set of support arms.

15. The oil filter system of claim 12, wherein the frame further comprises a first side support plate coupled between the first front arm and the first back arm and a second side support plate coupled between the second front arm and the second back arm, wherein each of the first bottom bracket and second bottom bracket is coupled between the first side support plate and second side support plate.

16. The oil filter system of claim 12, further comprising:
a first door coupled to a first open end of the housing;
a second door coupled to a second open end of the housing, each of the first door and the second door movably coupled to the housing via a respective set of hinges, each of the first open end and the second open end of the housing including an engagement ring configured to contact a respective engagement surface of the first door and the second door;

a first set of locking members to maintain the first door in contact with the housing; and a second set of locking members to maintain the second door in contact with the housing.

17. A system, comprising:

an oil filter comprising a housing which is configured to receive a plurality of oil filter elements disposed therein;

a fuel sub-assembly comprising one or more of a fuel filter, a fuel drain tank, a fuel transfer pump, a fuel water separator, a fuel heater, a fuel drain, a fuel strainer, or a fuel vent;

an oil cooler sub-assembly comprising a brazed heat exchanger; and a frame coupling the fuel sub-assembly and the oil cooler sub-assembly to the oil filter.

18. The system of claim 17, wherein the frame includes a first set of support arms and a second set of support arms, the first set of support arms including mountings configured to couple the frame to the fuel sub-assembly via a first frame sub-assembly, and the second set of support arms including mountings configured to couple the frame to the oil cooler sub-assembly via a second frame sub-assembly.

19. The system of claim 17, further comprising an engine configured to receive fuel from the fuel sub-assembly and oil from the oil filter, the engine supported by an engine block separate from the frame.

20. The system of claim 19, wherein the engine, the oil filter, the fuel sub-assembly, the oil cooler sub-assembly, and frame are each positioned in a vehicle, the oil filter, the fuel sub-assembly, the oil cooler sub-assembly, and frame positioned at a space of a floor of the vehicle separate from the engine.

* * * * *